US011928477B2

(12) United States Patent
Sliger et al.

(10) Patent No.: US 11,928,477 B2
(45) Date of Patent: Mar. 12, 2024

(54) APPLICATION-SPECIFIC SETTINGS FOR HOSTED APPLICATIONS USING CLIENT-SIDE AND HOST-SIDE TABLET DEVICE DRIVERS

(71) Applicant: Wacom Co., Ltd., Kazo (JP)

(72) Inventors: Joseph Vaughn Sliger, Vancouver, WA (US); Kenton Jay Loftus, Vancouver, WA (US); Jarrod Dunnihoo, Terrebonne, OR (US); Konrad Wilhelm Pollmann, Vancouver, WA (US)

(73) Assignee: Wacom Co., Ltd., Kazo (JP)

( * ) Notice: Subject to any disclaimer, the term of this patent is extended or adjusted under 35 U.S.C. 154(b) by 0 days.

(21) Appl. No.: 18/192,891

(22) Filed: Mar. 30, 2023

(65) Prior Publication Data
US 2023/0236841 A1    Jul. 27, 2023

Related U.S. Application Data

(63) Continuation of application No. 17/524,600, filed on Nov. 11, 2021, now Pat. No. 11,645,088.

(51) Int. Cl.
*G06F 9/44* (2018.01)
*G06F 9/4401* (2018.01)
*G06F 9/455* (2018.01)

(52) U.S. Cl.
CPC ........ *G06F 9/4411* (2013.01); *G06F 9/45529* (2013.01)

(58) Field of Classification Search
CPC .................................................. G06F 9/4411
(Continued)

(56) References Cited

U.S. PATENT DOCUMENTS

2011/0122070 A1   5/2011   Smith et al.
2012/0011445 A1   1/2012   Gilboa
(Continued)

FOREIGN PATENT DOCUMENTS

JP    6-242877 A      9/1994
WO    2022/131325 A1  6/2022

OTHER PUBLICATIONS

AWS; "Enabling touchscreen and stylus support;" located at https://docs.aws.amazon.com/dcv/latest/adminguide/enable-stylus.html; 2021, printed on Nov. 11, 2021; pp. 1-2; Amazon Web Services, Inc.
(Continued)

*Primary Examiner* — Timothy A Mudrick
(74) *Attorney, Agent, or Firm* — CHRISTENSEN O'CONNOR JOHNSON KINDNESS PLLC

(57) ABSTRACT

A host system includes a device driver with application-specific settings for a hosted application. Input data is generated by one or more tablet devices at a client computer system. A host-side data transfer application receives the input data and forwards it to the host-side driver, which sends the input data to the hosted application. The tablet data sent to the hosted application is configured according to application-specific settings of the host-side driver, which may support multiple application programming interfaces. A dedicated driver-to-driver connection may also be used to transmit data between client-side and host-side drivers. In another aspect, a host sends an identifier of a hosted application currently in use to a client-side driver, which uses that identifier to look up and apply application-specific settings to tablet data sent to the hosted application. This can eliminate the need for a host-side driver while still allowing application-specific settings for hosted applications.

20 Claims, 8 Drawing Sheets

(58) Field of Classification Search
USPC .......................................................... 719/321
See application file for complete search history.

(56) References Cited

U.S. PATENT DOCUMENTS

| | | |
|---|---|---|
| 2017/0090604 A1 | 3/2017 | Barbier |
| 2019/0220161 A1 | 7/2019 | Loftus et al. |
| 2021/0034132 A1 | 2/2021 | Hamlin et al. |
| 2021/0205534 A1 | 7/2021 | Jepson et al. |

OTHER PUBLICATIONS

AWS; "Enabling USB remotization;" located at https://docs.aws.amazon.com/dcv/latest/adminguide/manage-usb-remote.html; 2021, printed on Nov. 11, 2021; pp. 1-2; Amazon Web Services, Inc.

HP.com; "HP ZCentral Remote Boost User Guide;" located at http://h10032.www1.hp.com/ctg/Manual/c06615612.pdf; Aug. 2021; pp. 1-139; HP Development Company, L.P.

International Search Report and Written Opinion dated Jan. 24, 2023, issued in corresponding International Application No. PCT/US2022/048016, filed Oct. 27, 2022, 14 pages.

Lockhart, Eddie; "USB redirection (Universal Serial Bus redirection);" located at https://searchvirtualdesktop.techtarget.com/definition/USB-redirection-Universal-Serial-Bus-redirection; May 2016, printed on Nov. 10, 2021; pp. 1-3; TechTarget.

Net-Usb.com; "USB Redirector, USB device redirection to any environment;" located at https://www.net-usb.com/usb-redirector/; 2021, printed on Nov. 10, 2021; pp. 1-7; Electronic Team, Inc.

Teradici; "Teradici PCoIP Software Client 21.07 for macOS Administrators Guide;" located at https://www.teradici.com/web-help/pcoip_client/mac/21.07/pdf/software-client-mac_21_07.pdf; 2021; pp. 1-85.

Weis, Olga; "What is USB Redirection: Technology Explanation;" located at https://www.net-usb.com/usb-over-rdp/what-is-usb-redirection/; 2021, printed on Nov. 10, 2021; pp. 1-4; Electronic Team, Inc.

APPLICATION-SPECIFIC SETTINGS FOR HOSTED APPLICATIONS USING CLIENT-SIDE AND HOST-SIDE TABLET DEVICE DRIVERS

CROSS REFERENCE TO RELATED APPLICATIONS

This application is a continuation of U.S. application Ser. No. 17/524,600, filed Nov. 11, 2021, which is herein incorporated by reference in its entirety.

BACKGROUND

In a common remote computing or cloud computing scenario, an end user generates input data (e.g., via touchscreens, keyboards, or other input devices) at a client computer system, and the client computer system sends the input data to a host computer system, which provides the input data to an application running on the host. This hosted application processes the input data and generates output data such as video data that shows results of the input. For input devices such as pen tablets or touchscreens, such results may include cursor movement, digital link handwriting or drawings, or the like.

In prior systems, input data is delivered to the host in different ways, but these prior techniques suffer from significant technical limitations. In one example, the client system redirects input data obtained from a universal serial bus (USB) interface to a device driver on the host for processing. Although the client computer system may have a client-side device driver with its own device settings for local applications, those settings are not available to the host system. Separate device settings must be provided for client-side applications and hosted applications, which complicates use cases in which a user may wish to switch seamlessly between client-side and hosted applications without making manual adjustments to device settings. In a second example, the client system processes input data at a client-side device driver and then transmits that data to the host, which forwards the input data to a hosted application without using a host-side driver. In the second example, although the client-side driver is generating data that is ultimately transmitted to the host system, application-specific settings are not available for hosted applications, which limits the flexibility of the system.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

In one aspect, a host computer system provides hosted application services for a client computer system that includes a pen-input tablet device. The host computer system comprises one or more processors, a network interface, and non-transitory computer-readable media comprising at least one hosted application configured to be accessed by a user of the client computer system; a host-side tablet device driver that includes application-specific settings for the at least one hosted application; a host-side data transfer application; and computer-readable instructions configured to cause the host computer system to receive, by the host-side data transfer application via a client-side data transfer application, input data generated by the pen-input tablet device at the client computer system; send the input data generated by the pen-input tablet device from the host-side data transfer application to the host-side tablet device driver; and send the input data from the host-side tablet device driver to the at least one hosted application. The input data is configured according to the application-specific settings of the host-side tablet device driver. In some embodiments, the input data generated by the pen-input tablet device is provided to the client-side data transfer application by a client-side tablet device driver.

In another aspect, a non-transitory computer-readable medium has stored thereon computer-readable instructions configured to cause a host computer system to perform a method including steps comprising receiving, by a host-side tablet device driver from a client-side tablet device driver, composite tablet data generated by multiple tablet devices at a client computer system, wherein the multiple tablet devices include at least one pen-input tablet device; and sending the composite tablet data from the host-side tablet device driver to at least one hosted application at the host computer system. The at least one hosted application is configured to be accessed by a user of the client computer system and to process the composite tablet data, which is configured according to application-specific settings defined by the host-side tablet device driver.

In some embodiments, the composite tablet data is received by the host-side tablet device driver from the client-side tablet device driver via a dedicated driver-to-driver connection. In other embodiments, the composite tablet data is received by the host-side tablet device driver via a client-side data transfer application, such as a web browser application or some other data transfer module.

In another aspect, a host computer system provides hosted application services for a client computer system that includes a pen-input tablet device. The host computer system comprises one or more processors, a network interface, and non-transitory computer-readable media comprising a plurality of hosted applications configured to be accessed by a user of the client computer system; and computer-readable instructions configured to cause the host computer system to receive input data generated by the pen-input tablet device at the client computer system; determine one of the plurality of hosted applications that is currently in use; send the input data generated by the pen-input tablet device to the hosted application that is currently in use; send an identifier of the hosted application that is currently in use from the host computer system to a client-side tablet device driver; receive input data generated by the pen-input tablet device at the client computer system; and send the input data generated by the pen-input tablet device to the hosted application that is currently in use.

In some embodiments, the identifier of the hosted application that is currently in use is configured to cause the client-side tablet device driver to determine application-specific settings based on the identifier.

In some embodiments, the host computer system further comprises a monitoring utility, wherein the identifier of the hosted application that is currently in use is sent from the monitoring utility to a client-side tablet device driver. In other embodiments, a host-side driver includes functionality for identifying the hosted application currently in use, and the identifier is sent from the host-side driver to the client computer system.

In some embodiments, the identifier is sent from the host computer system to the client-side tablet device driver via a dedicated connection. In other embodiments, the identifier is sent from a host-side data transfer application to a client-side data transfer application, and the client-side data transfer application is configured to forward the identifier to the client-side tablet device driver.

In some embodiments, the input data is received by a host-side tablet device driver from the client-side tablet device driver via a dedicated driver-to-driver connection. In other embodiments, the input data is received by a host-side data transfer application from a client-side data transfer application.

In some embodiments, the input data generated by the pen-input tablet device is included in composite tablet data generated by multiple tablet devices.

In some embodiments, the identifier of the hosted application that is currently in use is configured to cause the client-side tablet device driver to determine client-side application-specific settings associated with the hosted application that is currently in use. In such embodiments, the client-side tablet device driver applies the client-side application specific settings to further input data generated by the pen-input tablet device and/or sends the client-side application specific settings to the host computer system to update corresponding settings in a host-side tablet device driver.

In some embodiments, the identifier is configured to cause the client-side tablet device driver to determine client-side application-specific settings for a client-side version of the application and to apply the same client-side application specific settings to further input data generated by the pen-input tablet device when the host computer system is running a host-side version of the application.

In another aspect, a host computer system comprises a plurality of hosted applications configured to be accessed by a user of the client computer system; a host-side tablet device driver; a host-side data transfer application; and computer-readable instructions configured to cause the host computer system to receive, by the host-side data transfer application via a client-side data transfer application, input data generated by the pen-input tablet device at the client computer system; send the input data generated by the pen-input tablet device from the host-side data transfer application to the host-side tablet device driver; and send the input data from the host-side tablet device driver to multiple available application programming interfaces for selection by a respective hosted application. In some embodiments, the input data is adjusted according to application-specific settings provided by the host-side tablet device driver. In other embodiments, the host computer system is configured to send an identifier of a hosted application currently in use to a client-side tablet device driver, and the input data received by the host system is adjusted by the client-side tablet device driver according to application-specific settings for the hosted application currently in use.

DESCRIPTION OF THE DRAWINGS

The foregoing aspects and many of the attendant advantages will become more readily appreciated as the same become better understood by reference to the following detailed description, when taken in conjunction with the accompanying drawings, wherein.

DETAILED DESCRIPTION

Figure 1:
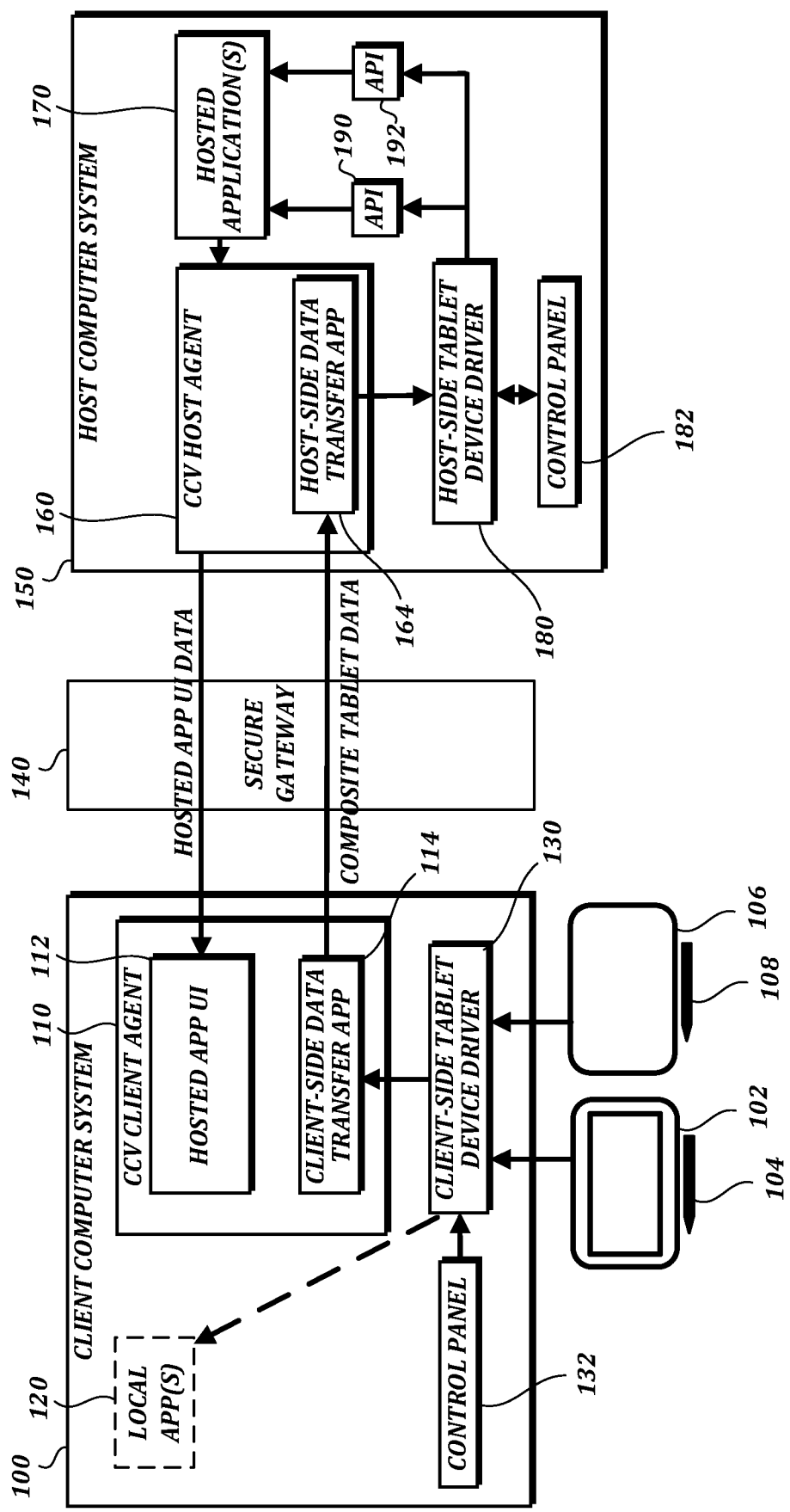
FIG. 1 is a block diagram of a computer system including aspects of a first illustrative embodiment.

In embodiments described herein, a client computer system (such as a desktop computer, notebook computer, or any other suitable computing device or combination of computing devices) is configured to access one or more applications hosted by a host computer system, such as a cloud computing system. The client computer system is communicatively coupled to one or more tablet devices such as a pen display, a pen tablet, or other tablet device. In some embodiments, tablet devices are configured for collecting tablet data in the form of pen position or pressure data, pen or tablet button data, touch input data, or the like, which may be generated as a user produces drawings, handwritten notes or characters, signatures, gestures, or the like, in the context of the hosted application(s). Embodiments disclosed herein provide novel approaches that improve performance, simplify system design, and/or improve user experience in scenarios in which client computer systems access hosted applications such as drawing applications, digital painting applications, digital photo editing applications, or the like.

In embodiments described herein, tablet device drivers support the operation of tablet devices by providing application-specific settings for those devices, either at the client side or the host side. A device driver is computer program code that is used by a computer system to control or support the operation of a hardware device. Driver functionality for tablet devices can be implemented in different computer systems. For example, in some embodiments described herein, a client computer system to which tablet devices are communicatively coupled includes a client-side driver, while a host computer system, which receives input data from the client computer system rather than directly from the tablet devices, includes a host-side driver having application-specific settings for the hosted application.

In one embodiment, a client-side driver receives input from one or more tablet devices and provides the input data to a client-side data transfer application, which transmits the input data to a host-side data transfer application. The host-side data transfer application then provides the input data to a host-side driver. The host-side driver includes application-specific tablet device settings (e.g., pen settings, touch settings, button settings, etc.) for the hosted application. The host-side driver provides the input data to the hosted application(s) for processing and generation of output data, which may include, e.g., video data that shows results of the input (e.g., cursor movement, lines drawn on a virtual canvas, etc.). The host computer system then transmits the output data to the client computer system for display in an efficient way, which allows the user to, e.g., work on a digital illustration in a hosted application without having to manually configure device settings for the hosted application and without noticeable time lag. In another embodiment, the client-side and host-side data transfer applications are omitted, and a dedicated driver-to-driver connection is enabled between the client-side driver and the host-side driver, which in some situations simplifies the design and may further reduce time lag.

In another embodiment, instead of relying on a host-side driver for application-specific settings, the host computer system monitors which hosted application is currently in use and sends an identifier of that application to the client computer system. The client-side driver selects device settings based on that identifier to ensure correct configuration for the hosted application currently in use.

In another embodiment, the host computer system includes multiple hosted applications and a host-side driver that supports multiple application programming interfaces (APIs) for the hosted applications. The host-side driver provides the input data to the multiple APIs, and the hosted applications choose from among the available APIs to obtain the input data from an appropriate API for that application.

These embodiments and other variations and alternatives are described in further detail below.

In embodiments described herein, a client computer system receives input data (e.g., pen event data, such as coordinate data and pressure data, or input data other than pen event data (e.g., context data, biometric data, touch data, button data, etc.) from one or more tablet devices. The content of the input data (e.g., pen resolution, pressure levels, pen tilt support, button input, etc.) may depend on the configuration or capabilities of software being used with the tablet device or the tablet device itself. In some embodiments, tablet devices use electromagnetic resonance (EMR) technology, in which a tablet device incorporates a sensor board that detects the pen's movement. Energy is induced in the pen's resonant circuit by an electro-magnetic field generated by the sensor board surface. The pen's resonant circuit then makes use of this energy to return an electromagnetic signal to the sensor board surface. The board detects the pen's coordinate position at regular time intervals even if the electronic pen does not touch the sensor board surface, so long as the pen remains within close enough proximity to the sensor board, such that signals can still be received from the pen. (The effective signal range can vary depending on the particular technology being used, but is generally on the order of several millimeters.)

Alternatively, other input technology can be used. For example, an electronic pen may use other wireless technology or may be connected by a wire to a digitizer. As another example, an electronic pen may or may not be detectable away from the surface of a digitizer. As another example, an electronic pen may be powered or unpowered. Powered pens may receive power via a wire connected to an external power source or via an on-board battery. As another example, it is possible to input handwriting data without an electronic pen (e.g., via a stylus on a pressure sensitive digital writing pad, a touchscreen, or some other input device that does not require an electronic pen).

However the input data may be collected, input data provided by tablet devices may include pen event information, device information, and/or contextual information about the context in which the input was made. Pen event information may include the x/y position of the pen-tip on or above the digitizer surface and the time since the start of the handwriting. In addition to x/y-coordinate values, pen event information may optionally include additional information subject to the capabilities of the electronic handwriting device, such as pressure (pen force), angles (azimuth, altitude, and/or rotation) and pen-down status.

First Illustrative Embodiment

In this section, a first illustrative embodiment is described in which a client computer system (such as a desktop computer, notebook computer, or any other suitable computing device or combination of devices) is communicatively coupled to multiple tablet devices that provide input in the context of one or more hosted applications. In the first illustrative embodiment, a host-side tablet device driver includes application-specific tablet device settings for the hosted application(s).

FIG. 1 is a block diagram of a system according to the first illustrative embodiment. In the example shown in FIG. 1, a client computer system 100 communicates with a host computer system 150 via a secure gateway 140 over a network, such as the Internet. The client computer system 100 is configured to provide access to one or more hosted applications 170 hosted by host computer system 150. The client computer system 100 displays a hosted application user interface (UI) 112 associated with a hosted application 170. In the example shown in FIG. 1, this occurs in a cloud computing vendor (CCV) client agent 110, which also includes a client-side data transfer application 114. In an illustrative scenario, a user inputs account data (e.g., an account ID and password) via the hosted application UI 112, and the client computer system 100 transmits an authentication request to the host computer system 150, which checks that the authentication request is associated with a valid user before granting access to the hosted application 170. Optionally, the client computer system 100 also executes one or more local applications 120.

The client computer system 100 receives input from multiple tablet devices that capture electronic pen input. In this example, the tablet devices include a pen display 102 (e.g., a Wacom® One, Cintiq, or Cintiq Pro creative pen display, or some other pen display device) and a pen tablet 106 (e.g., a Wacom® Intuos, Intuos Pro, or One by Wacom® creative pen tablet, or some other tablet device) with corresponding pens 104, 108. The pen display 102 includes a display device (e.g., an LCD screen) which displays, e.g., an electronic document, user interface, or graphic artwork for which the pen display 102 is used to provide input. Alternatively, other electronic handwriting capture devices may be used.

The tablet devices provide input data (also referred to herein as tablet data) to a client-side tablet device driver 130. In the example shown in FIG. 1, the client-side tablet device driver 130 integrates tablet data from the pen display 102 and the pen tablet 106 into composite tablet data. In some embodiments, the composite tablet data is presented in the form of a virtual tablet data set, as it combines input data from different tablets into a single combined data set as though it were associated with a single tablet device. The client-side tablet device driver 130 forwards the composite tablet data to the client-side data transfer application 114 for transmission to the host computer system 150, potentially along with non-tablet data such as keyboard data, mouse data, or the like. In this way, it is possible for the system to handle input from multiple tablet devices with a single client-side tablet device driver 130.

Alternatively, if only one tablet device is present, the client-side tablet device driver 130 forwards the input data from that tablet data to the client-side data transfer application 114 for transmission to the host computer system 150.

In the example shown in FIG. 1, the host computer system 150 includes a CCV host agent 160, which in turn includes a host-side data transfer application 164. In this example, the host-side data transfer application 164 receives the composite tablet data from the client-side data transfer application 114 and forwards the composite tablet data to a host-side tablet device driver 180, which includes application-specific tablet device settings (e.g., pen settings, touch settings, button settings, etc.) for the hosted application. The host-side tablet device driver 180 adjusts the tablet data based on the application-specific settings for the one or more hosted applications 170 and provides the adjusted tablet data to multiple APIs 190, 192. This allows an active hosted application to choose an appropriate API to obtain the tablet data for that application. The APIs that are present on the host computer system 150 may vary depending on the requirements of the hosted application(s) 170. In one illustrative scenario, available APIs include Windows Ink available from Microsoft Corporation and Wintab API available from Wacom Co., Ltd., and macOS APIs available from Apple Inc. Alternatively, other APIs or combinations of APIs may be used.

The one or more hosted applications 170 process the adjusted tablet data and provide output to the CCV host agent 160, which transmits the output to the client computer system 100 for display to a user via the CCV client agent 110.

Settings for the client-side tablet device driver 130 can be adjusted (e.g., by an end user or administrator) via a control panel 132. Similarly, settings for the host-side tablet device driver 180 can be adjusted using a control panel 182. Other options for adjusting settings using device drivers on the host or client side are described in further detail below in the context of other illustrative embodiments.

The first illustrative embodiment has several technical advantages. First, combination of the host-side tablet device driver 180 having application-specific settings for the hosted application(s) 170 on the host computer system 150 and the client-side tablet device driver 130 on the client computer system 100 allows users to easily switch between using the tablet devices to provide input to the local application(s) 120 on the client side and to the hosted application(s) 170 on the host side. In some embodiments, the host-side tablet device driver 180 supports multiple APIs and is not limited to pen input APIs that are part of the operating system.

Second Illustrative Embodiment

In this section, a second illustrative embodiment is described in which a client computer system is communicatively coupled to a tablet device that may be used to provide input to one or more hosted applications using a dedicated driver-to-driver connection. In the second illustrative embodiment, a host-side tablet device driver includes application-specific tablet device settings for the hosted application(s) and communicates with a client-side driver using the dedicated driver-to-driver connection.

In some embodiments, the dedicated driver-to-driver connection uses the same secure gateway that may be used to receive hosted application UI data for display but is separate from the connection between a client agent and host agent that is used to transmit non-tablet data (e.g., keyboard data or mouse data) or output data from the hosted application(s).

Figure 2:
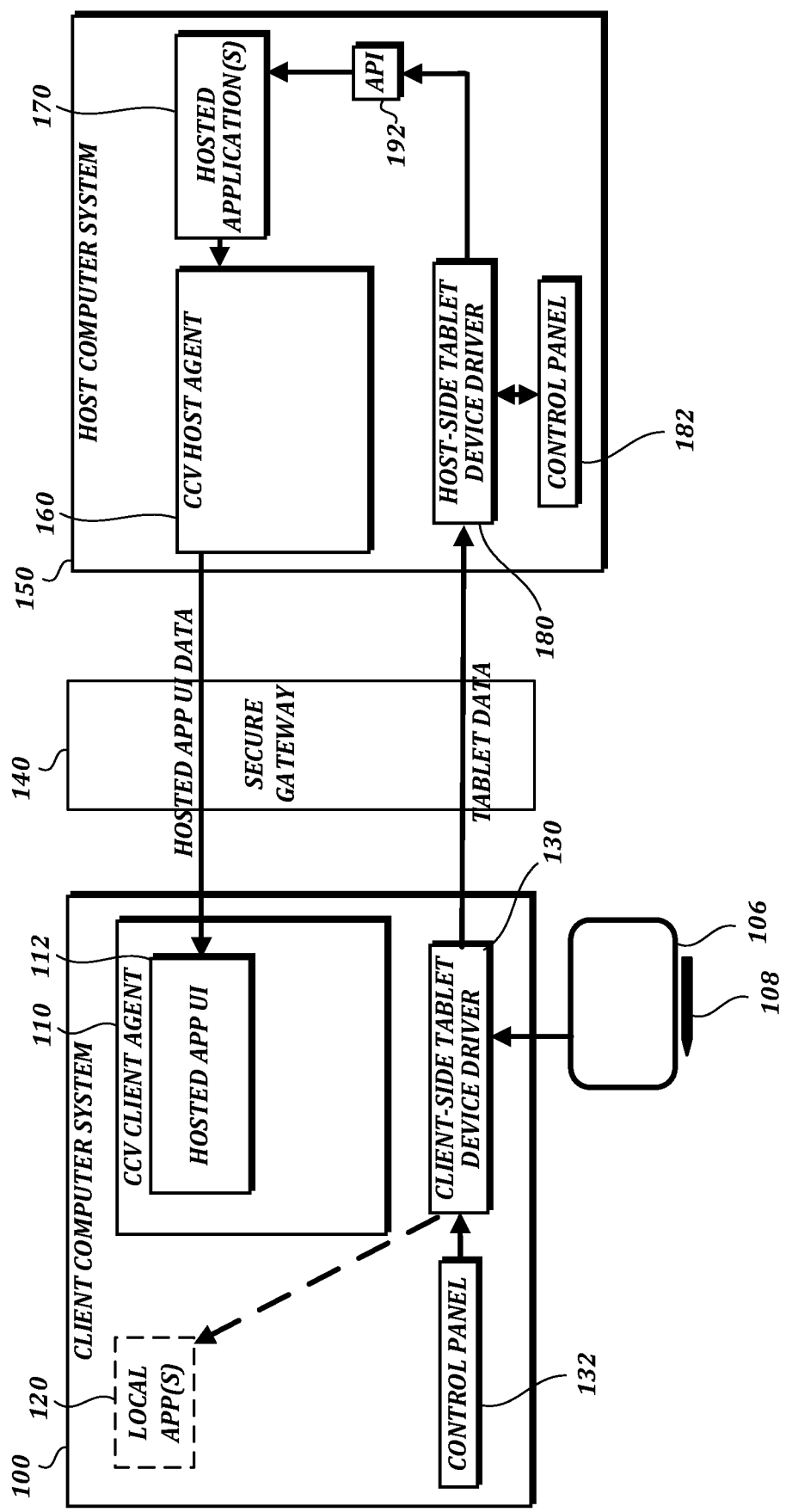
FIG. 2 is a block diagram of a computer system including aspects of a second illustrative embodiment.

FIG. 2 is a block diagram of a system according to the second illustrative embodiment. In the example shown in FIG. 2, the CCV client agent 110 receives hosted application UI data, but the client-side data transfer application 114, is omitted. The client computer system 100 receives input from a tablet device, such as a pen tablet 106. Alternatively, other input devices may be used.

The tablet device provides tablet data to client-side tablet device driver 130. In the example shown in FIG. 2, the client-side tablet device driver 130 forwards the tablet data to the host-side tablet device driver 180 of the host computer system 150 via the secure gateway 140 in a dedicated driver-to-driver connection. The host computer system 150 includes a CCV host agent 160, but the host-side data transfer application 164 is omitted in favor of the dedicated driver-to-driver connection. The host-side tablet device driver 180 includes application-specific settings for the one or more hosted applications 170.

In the example shown in FIG. 2, the host-side tablet device driver 180 provides the tablet data to a single API 192, by which the one or more hosted applications 170 obtain the tablet data. Alternatively, a multiple-API arrangement may be used. The one or more hosted applications 170 process the tablet data and provide output to the CCV host agent 160, which transmits the output to the client computer system 100 for display.

The second illustrative embodiment has several technical advantages. As in the first illustrative embodiment, the combination of the host-side tablet device driver 180 having application-specific settings for the hosted application(s) 170 and the client-side tablet device driver 130 on the client computer system 100 allows users to easily switch between the local application(s) 120 on the client side and the hosted application(s) 170 on the host side. The dedicated driver-to-driver connection allows the second illustrative embodiment to omit modules such as the client-side data transfer application 114 and the host-side data transfer application 164, thus simplifying system design. In some embodiments, the client-side tablet device driver 130 is able to send custom data to the host-side tablet device driver 180. Such custom data provided by the client-side tablet device driver 130 can be used to, e.g., optimize performance of the host-side tablet device driver 180 or allow support of additional features, such as ExpressKeys data available on Wacom® Intuos Pro pen tablets. The second illustrative embodiment also provides an option for a simplified design in systems that are limited to a single tablet device per client, as the client-side tablet device driver 130 need not be configured to provide composite tablet data and the host-side tablet device driver 180 need not be configured to process composite tablet data.

Third Illustrative Embodiment

In this section, a third illustrative embodiment is described in which a client computer system is communicatively coupled to multiple tablet devices that may be used to provide input to one or more hosted applications using a dedicated driver-to-driver connection.

Figure 3:
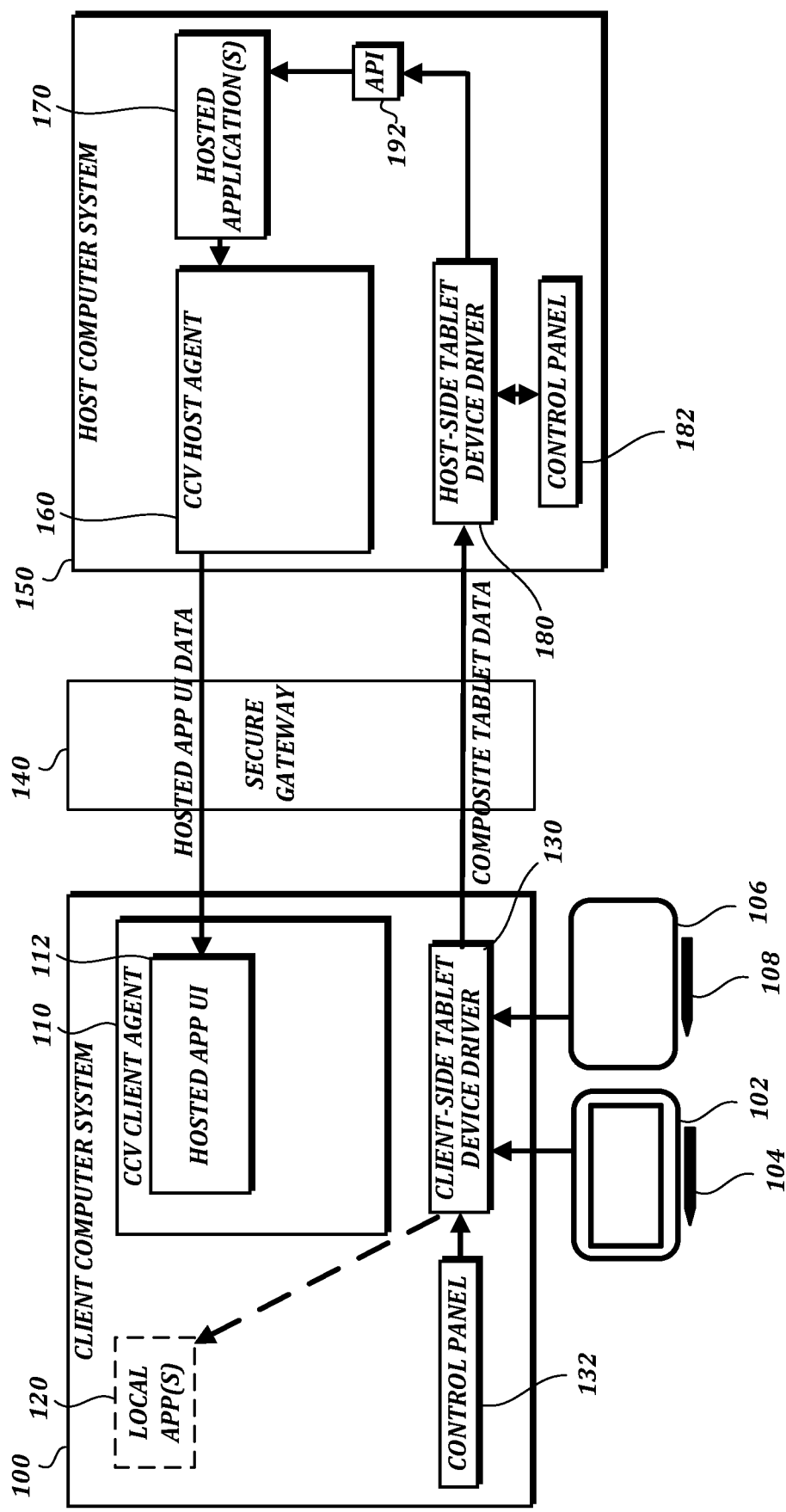
FIG. 3 is a block diagram of a computer system including aspects of a third illustrative embodiment.

FIG. 3 is a block diagram of a system according to the third illustrative embodiment. In the example shown in FIG. 3, the client computer system 100 receives input from multiple tablet devices, such as a pen display 102 and a pen tablet 106. Alternatively, other electronic handwriting capture devices may be used. In the example shown in FIG. 3, similar to the example shown in FIG. 1, the client-side tablet device driver 130 integrates tablet data from the tablet devices into composite tablet data, but unlike the example in FIG. 1, the client-side tablet device driver 130 forwards the composite tablet data to the host-side tablet device driver 180 of the host computer system 150 via the secure gateway 140 in a dedicated driver-to-driver connection. The host computer system 150 includes a CCV host agent 160 but the host-side data transfer application 164 is omitted in favor of the dedicated driver-to-driver connection.

The host-side tablet device driver 180 includes application-specific settings for the one or more hosted applications 170. In the example shown in FIG. 3, the host-side tablet device driver 180 adjusts the tablet data based on the application-specific settings and provides the adjusted tablet data to a single API 192, by which the one or more hosted applications 170 obtain the tablet data. Alternatively, a multiple-API arrangement may be used. The one or more hosted applications 170 process the tablet data and provide output to the CCV host agent 160, which transmits the output to the client computer system 100 for display.

The third illustrative embodiment has several advantages. As in the first illustrative embodiment, the combination of the host-side tablet device driver 180 having application-specific settings for the hosted application(s) 170 and the client-side tablet device driver 130 on the client computer system 100 allows users to easily switch between the local application(s) 120 on the client side and to the hosted application(s) 170 on the host side. The third illustrative embodiment also allows use of multiple tablet devices; settings on the client-side tablet device driver 130 that are applicable to those devices can be used automatically on the host computer system 150 as well. As in the second illustrative embodiment, the dedicated driver-to-driver connection allows the third illustrative embodiment to omit additional modules such as the client-side data transfer application 114 and the host-side data transfer application 164, or at least to avoid using them for transmission of composite tablet data, while also allowing the client-side tablet device driver 130 to send custom data to the host-side tablet device driver 180. Such custom data provided by the client-side tablet device driver 130 can be used to, e.g., optimize performance of the host-side tablet device driver 180 or allow support of additional features.

Fourth, Fifth, and Sixth Illustrative Embodiments

In this section, fourth, fifth, and sixth illustrative embodiments are described in which the host computer system includes multiple hosted applications and functionality for indicating to the client-side driver which of the hosted applications is currently in use. This allows the client computer system to provide application-specific settings for both local and hosted versions of an application via the client-side driver.

Figure 4:
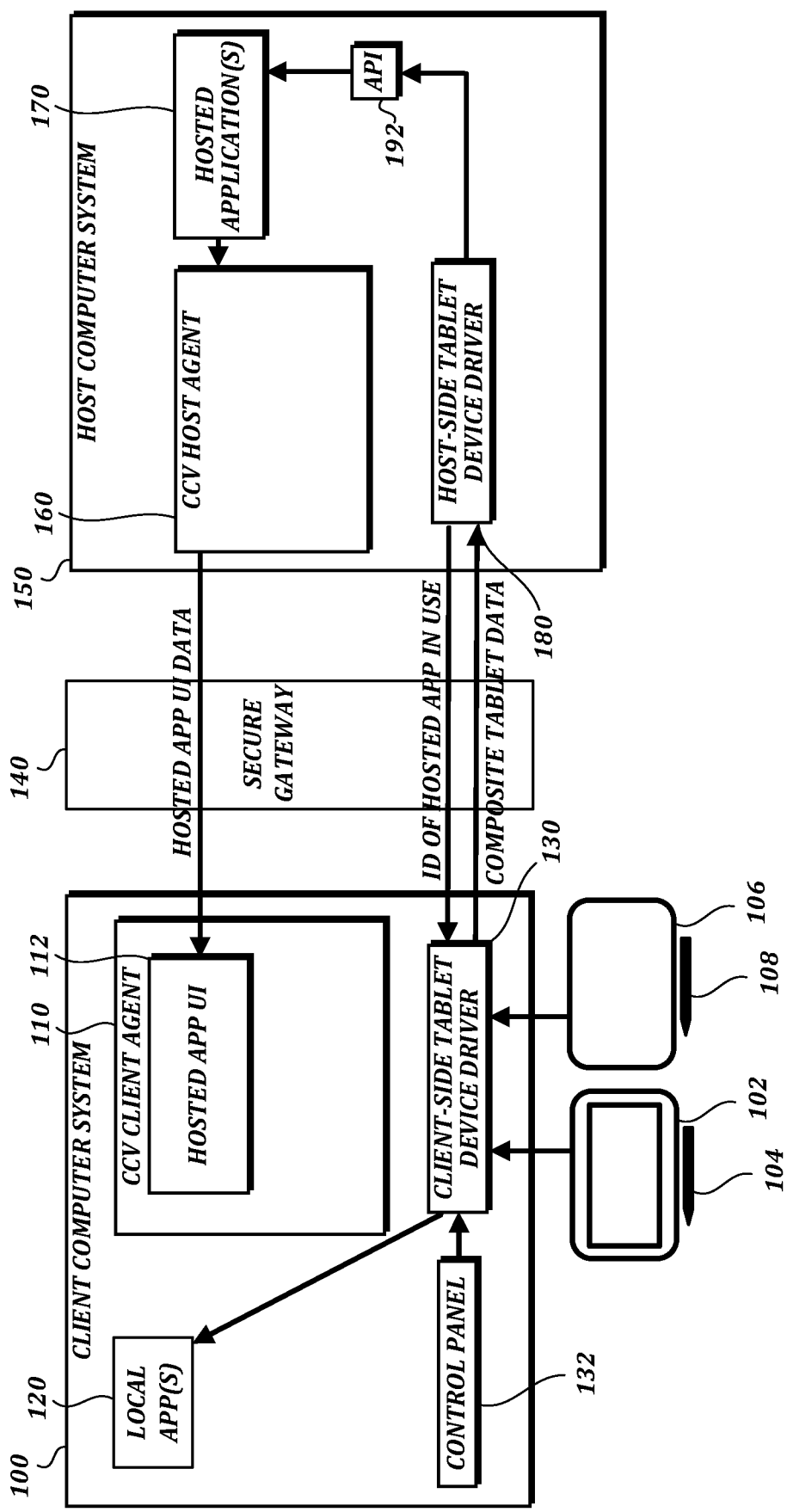
FIG. 4 is a block diagram of a computer system including aspects of a fourth illustrative embodiment.

FIG. 4 is a block diagram of a system according to the fourth illustrative embodiment. In the example shown in FIG. 4, the client computer system 100 receives input from multiple tablet devices, such as a pen display 102 and a pen tablet 106. In the example shown in FIG. 4, like the example shown in FIG. 3, the client-side tablet device driver 130 integrates tablet data from the tablet devices into composite tablet data and forwards the composite tablet data to the host-side tablet device driver 180 in a dedicated driver-to-driver connection. The host-side tablet device driver 180 adjusts the tablet data based on application-specific settings and provides the adjusted tablet data to a single API 192, by which hosted applications 170 obtain the tablet data. Alternatively, a multiple-API arrangement may be used. The hosted applications 170 process the tablet data and provide output, which the host computer system 150 transmits to the client computer system 100 for display.

In the example shown in FIG. 4, the host-side tablet device driver 180 also monitors which one of the hosted applications 170 is currently in use and sends an identifier of that application back to the client-side tablet device driver 130, which receives the identifier and looks up corresponding settings for the hosted application in use based on that identifier. This feature allows the client-side tablet device driver 130 to determine settings for the hosted application currently in use. As one option, the client-side tablet device driver 130 can send application-specific settings to the host-side tablet device driver 180 using the dedicated driver-to-driver connection to allow the host-side tablet device driver 180 to adjust the composite tablet data based on those settings. Alternatively, the client-side tablet device driver 130 can itself make the adjustments to the tablet data based on those application-specific settings and send appropriately adjusted composite tablet data to the host-side tablet driver. This alternative is useful because it obviates the need for the host-side driver to adjust the tablet data based on the application-specific settings, and the host-side tablet device driver 180 need not separately store such settings.

Figure 5:
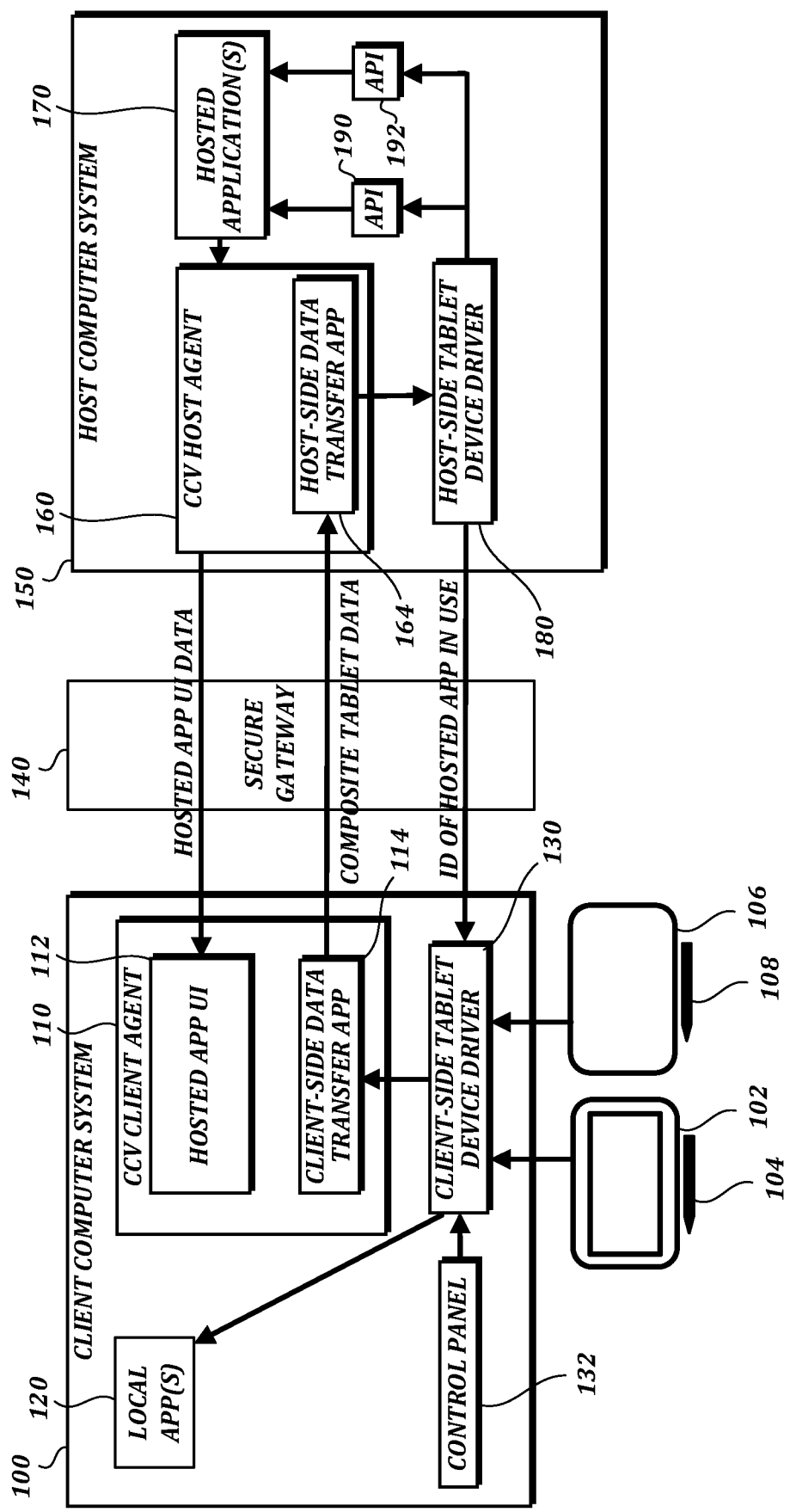
FIG. 5 is a block diagram of a computer system including aspects of a fifth illustrative embodiment.

FIG. 5 is a block diagram of a system according to the fifth illustrative embodiment. In the example shown in FIG. 5, similar to the first illustrative embodiment, the client-side tablet device driver 130 forwards composite tablet data to the client-side data transfer application 114 for transmission to the host computer system 150, where a host-side data transfer application 164 receives the composite tablet data and forwards it to the host-side tablet device driver 180. However, the fifth illustrative embodiment differs from the first illustrative embodiment in that, similar to the fourth illustrative embodiment, the host-side tablet device driver 180 includes functionality for monitoring which one of hosted applications 170 is currently in use so that the client-side driver can make the adjustments to the tablet data based on application-specific settings and then send appropriately adjusted tablet data for that application to the host-side tablet driver. In the fifth illustrative embodiment, the host computer system 150 uses a dedicated driver-to-driver connection to send an identifier of the application currently in use back to the client-side tablet device driver 130.

Figure 6:
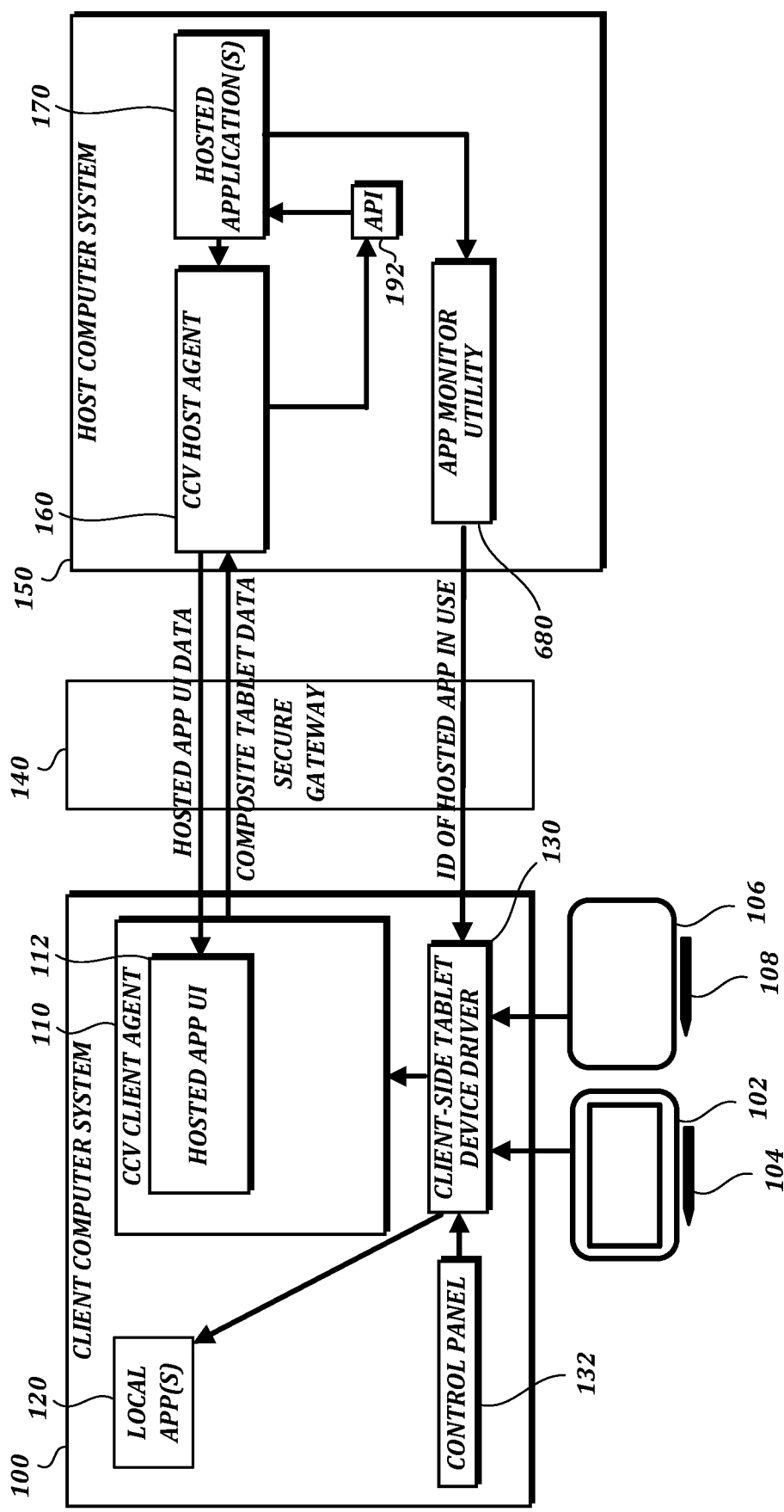
FIG. 6 is a block diagram of a computer system including aspects of a sixth illustrative embodiment.

FIG. 6 is a block diagram of a system according to the sixth illustrative embodiment. In the example shown in FIG. 6, the client computer system 100 communicates with the host computer system 150 via the secure gateway 140 over a network, such as the Internet. The client computer system 100 displays a UI 112 associated with a hosted application. The client computer system 100 also includes a local application 120. The client-side tablet device driver 130 integrates tablet data from multiple tablet devices into composite tablet data and provides the composite tablet data to the CCV client agent 110, which forwards the composite tablet data to the host computer system 150 via the secure gateway 140. The host agent 160 then forwards the tablet data via an API 192 to the hosted applications 170. The hosted applications 170 process the tablet data and generate output which is transmitted back to the client computer system 100 via the secure gateway 140 for display.

In the example shown in FIG. 6, similar to the fourth illustrative embodiment shown in FIG. 4, the host computer system 150 includes functionality for monitoring which one of the hosted applications 170 is currently in use and for sending an identifier of that application back to the client-side tablet device driver 130 (e.g., via the secure gateway 140). However, in the example shown in FIG. 6, this functionality is provided by an application monitor utility 680 rather than the host-side tablet device driver 180. The client-side tablet device driver 130 receives the identifier of the application currently in use from the application monitor utility 680 and looks up and applies corresponding settings for the tablet data that are appropriate for use with that application. This design allows the host-side tablet device driver 180 to be entirely omitted from the host computer system 150 while still providing functionality for applying device settings appropriate for the hosted applications 170.

The fourth, fifth, and sixth illustrative embodiments have several advantages. In addition to having some of the advantages described above with regard to the first, second, and third illustrative embodiments, by configuring the host computer system 150 to monitor and send an identifier of the hosted application currently in use (either by the host-side tablet device driver 180, the application monitor utility 680, or in some other way) and configuring the client-side tablet device driver 130 to look up and apply appropriate tablet data settings for the identified application based on the identifier, the client can not only control tablet settings for multiple tablets but also apply such settings to both hosted applications and local applications. The same application-specific settings can be automatically applied for hosted and local versions of an application. This allows users to easily switch between, say, using the local application(s) 120 on the client side and the hosted applications 170 on the host side and avoids the need for the host computer system 150 to store application-specific settings for individual clients. In an illustrative scenario, a user may access hosted applications in different host systems and, based on an indication of which hosted application is in use, select appropriate tablet device settings for that hosted application based on information stored on the client computer system 100.

Many alternatives to the embodiments described above are possible. As but one example, hosted applications may be accessed with a web browser rather than a dedicated CCV client agent. In such an example, the web browser may be considered to act as a CCV client agent for the purpose of accessing a hosted application. In this type of alternative implementation, the client computer system may communicate with the host computer system via an HTTPS connection over a network, such as the Internet, and may display a UI associated with a hosted application in the browser. The browser may have limitations in terms of the types of protocols it can use to send data, whereas a dedicated CCV client agent may not be so limited, but this may be an acceptable tradeoff in some scenarios, such as where a dedicated CCV client agent is not available or not present on the client computer system.

Illustrative Processes

Illustrative processes described in this section can be performed by one or more embodiments of computer systems described herein, or by some other suitably configured computer system.

Figure 7:
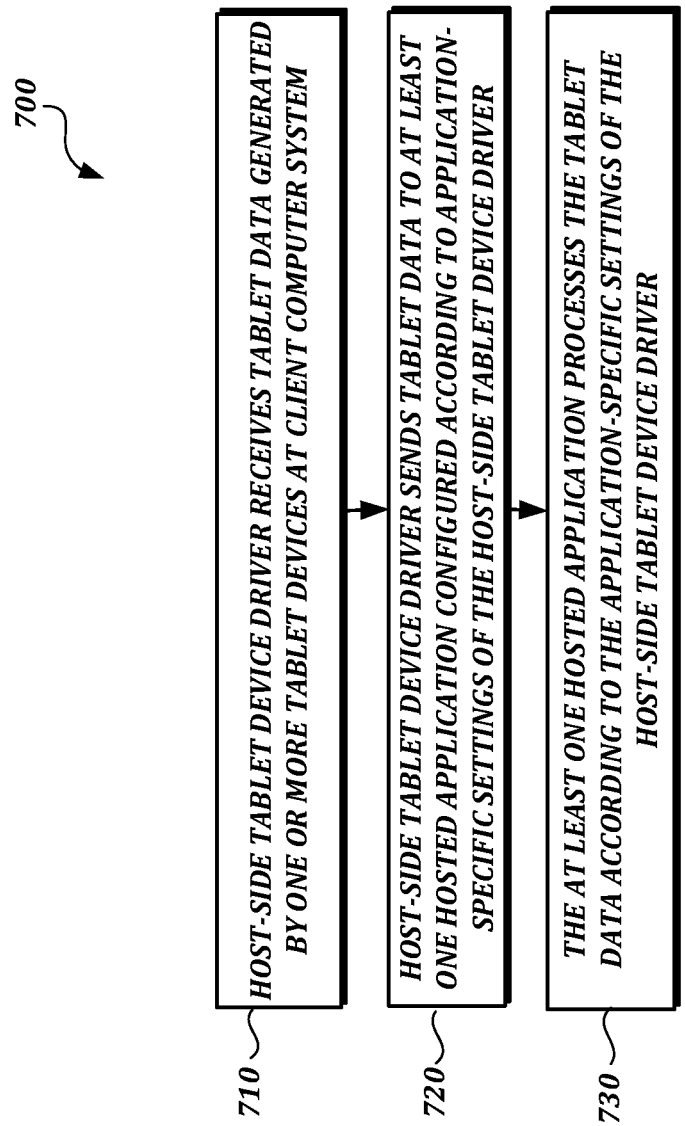
FIGS. 7 and 8 are flow diagrams of illustrative processes performed by a host computer system including aspects of illustrative embodiments described herein.

FIG. 7 is a flow diagram of an illustrative process 700 performed by a host computer system (e.g., the host computer system 150 of FIG. 1, 2, 3, 4, or 5) according to one or more embodiments described herein. At step 710, a host-side tablet device driver of the host computer system receives tablet data generated by one or more tablet devices at a client computer system. In some embodiments, the tablet data is composite tablet data comprising input data from multiple tablet devices. In some embodiments, a host-side data transfer application (e.g., a data transfer application of a CCV host agent) receives the tablet data from a client-side data transfer application (e.g., a web browser or a data transfer application of a CCV client agent) and sends the tablet data to the host-side tablet device driver. Alternatively, the host-side tablet device driver receives the tablet data from a client-side tablet device driver via a dedicated driver-to-driver connection. At step 720, the host-side tablet device driver sends the tablet data to at least one hosted application, where the tablet data is configured according to application-specific settings defined by the host-side tablet device driver. The application-specific settings defined by the host-side tablet device driver may be manually or automatically updated. In some embodiments, the client computer system sends client-side application specific settings to the host computer system to update corresponding settings in the host-side tablet device driver. For example, the client computer system may receive an identifier of a hosted application currently in use and select client-side application specific settings based on that identifier, and then send the client-side application specific settings to the host computer system to update corresponding settings in the host-side tablet device driver. At step 730, the hosted application processes the tablet data which has been configured according to the application-specific settings defined by the host-side tablet device driver.

In some embodiments, the host-side tablet device driver sends the tablet data to multiple available APIs associated with hosted applications. For example, a host computer system may include multiple hosted applications configured to select an appropriate one of the available APIs to obtain the tablet data for that respective hosted application.

Figure 8:
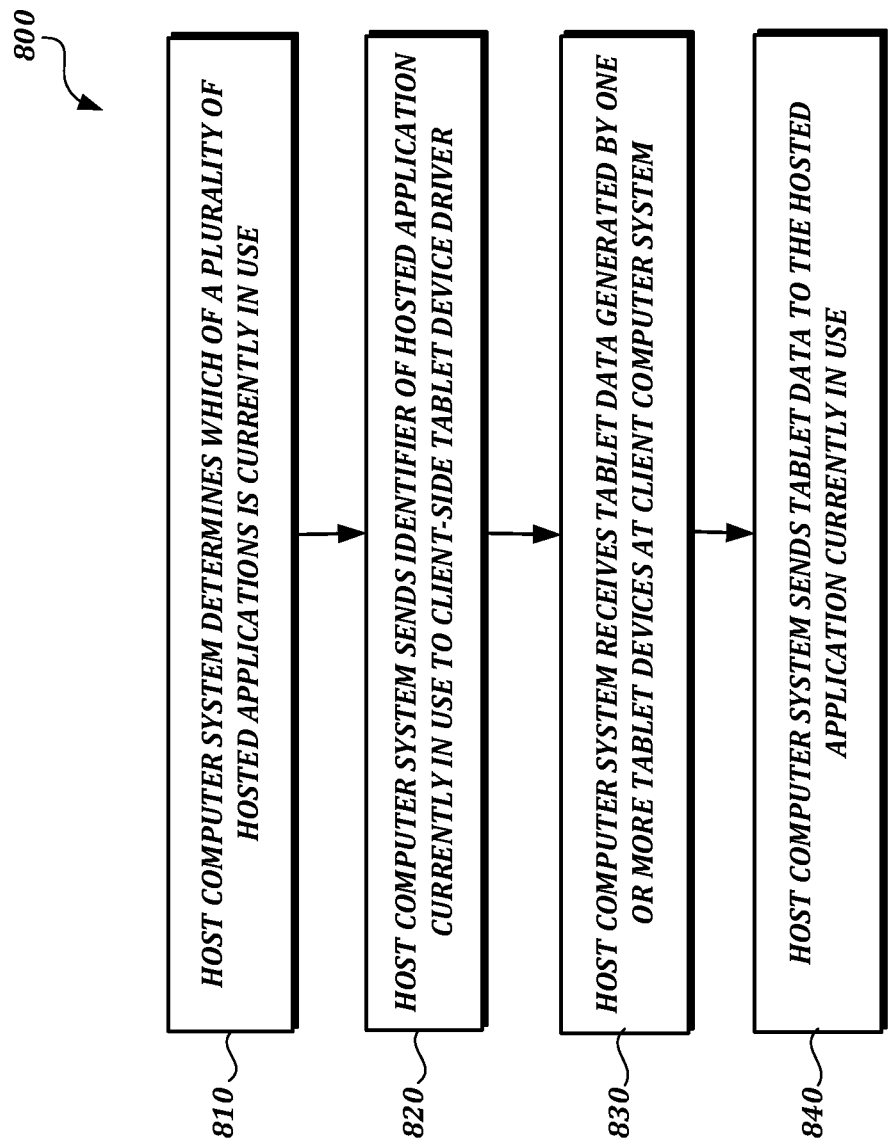

FIG. 8 is a flow diagram of another illustrative process 800 performed by a host computer system (e.g., the host computer system 150 of FIG. 4, 5, or 6) according to one or more embodiments described herein. At step 810, the host computer system determines which of a plurality of hosted applications is currently in use. At step 820, the host computer system sends an identifier of the hosted application currently in use to a client-side tablet device driver. In some embodiments, the identifier of the hosted application that is currently in use is configured to cause the client-side tablet device driver to determine application-specific settings based on the identifier. For example, the identifier may be configured to cause the client-side tablet device driver to determine client-side application-specific settings associated with the hosted application that is currently in use and to apply the client-side application specific settings to further input data generated by the pen-input tablet device and/or to send the client-side application specific settings to the host computer system to update corresponding settings in a host-side tablet device driver.

In some embodiments, the identifier is configured to cause the client-side tablet device driver to determine client-side application-specific settings for a client-side version of the application and to apply the same client-side application specific settings to further input data generated by the pen-input tablet device when the host computer system is running a host-side version of the application.

In some embodiments, a host-side client device driver includes functionality for determining which hosted application is currently in use. Alternatively, the host computer system uses a dedicated monitoring utility or some other component to make this determination.

In some embodiments, the identifier is sent from a host-side data transfer application to a client-side data transfer application, and the client-side data transfer application is configured to forward the identifier to the client-side tablet device driver. Alternatively, the identifier is sent from the host computer system to the client-side tablet device driver via a dedicated driver-to-driver connection or some other dedicated connection, such as from a monitoring utility to the client-side tablet device driver.

Illustrative Computing Environments

Embodiments described herein can be implemented by suitably programmed and configured computing devices, individually or in combination. The description below is applicable to computing devices such as servers, personal computers, mobile phones, smart phones, tablet computers, embedded computing devices, handwriting devices, and other currently available or yet to be developed devices that may be used in accordance with embodiments of the present disclosure.

In its most basic configuration, a computing device includes at least one processor and a system memory connected by a communication bus. Depending on the exact configuration and type of device, the system memory may be volatile or nonvolatile memory, such as read only memory ("ROM"), random access memory ("RAM"), EEPROM, flash memory, or other memory technology. Those of ordinary skill in the art and others will recognize that system memory typically stores data and/or program modules that are immediately accessible to and/or currently being operated on by the processor. In this regard, the processor may serve as a computational center of the computing device by supporting the execution of instructions.

The computing device may include a network interface comprising one or more components for communicating with other devices over a network. Embodiments of the present disclosure may access basic services that utilize a network interface to perform communications using common network protocols. The network interface may also include a wireless network interface configured to communicate via one or more wireless communication protocols, such as WiFi, 2G, 3G, 4G, LTE, 5G, WiMAX, Bluetooth, and/or the like.

The computing device also may include a storage medium. However, services may be accessed using a computing device that does not include means for persisting data to a local storage medium. Therefore, the storage medium is optional. In any event, the storage medium may be volatile or nonvolatile, removable or non-removable, implemented using any technology capable of storing information such as, but not limited to, a hard drive, solid state drive, CD-ROM, DVD, or other disk storage, magnetic tape, magnetic disk storage, and/or the like.

As used herein, the term "computer readable medium" includes volatile and nonvolatile and removable and non-removable media implemented in any method or technology capable of storing information, such as computer readable instructions, data structures, program modules, or other data. In this regard, system memory and storage media are examples of computer readable media.

For ease of illustration and because it is not important for an understanding of the claimed subject matter, the figures do not show some of the typical components of many computing devices. In this regard, a computing device may include input devices, such as a keyboard, keypad, mouse, trackball, microphone, video camera, touchpad, touchscreen, stylus, and/or the like. Such input devices may be coupled to the computing device by wired or wireless connections including RF, infrared, serial, parallel, Bluetooth, USB, or other suitable connection protocols using wireless or physical connections.

In any of the described examples, data can be captured by input devices (e.g., tablet devices or other electronic handwriting devices) and transmitted or stored for future processing. The processing may include encoding data, which can be subsequently decoded for presentation by output devices. Input devices can be separate from and communicatively coupled to a computing device, or can be integral components of the computing device. The computing device may also include output devices such as a display or touchscreen. The output devices can be separate from and communicatively coupled to the computing device, or can be integral components of the computing device. Input functionality and output functionality may be integrated into the same input/output device (e.g., a touchscreen). Any suitable input device, output device, or combined input/output device either currently known or developed in the future may be used with described systems.

In general, functionality of computing devices described herein may be implemented in computing logic embodied in hardware or software instructions, which can be written in a programming language, such as C, C++, COBOL, JAVA™, PHP, Perl, Python, Ruby, HTML, CSS, JavaScript, VBScript, ASPX, Microsoft.NET™ languages such as C#, and/or the like. Computing logic may be compiled into executable programs or written in interpreted programming languages. Generally, functionality described herein can be implemented as logic modules that can be duplicated to provide greater processing capability, merged with other modules, or divided into sub modules. The computing logic can be stored in any type of computer readable medium (e.g., a non-transitory medium such as a memory or storage medium) or computer storage device and be stored on and executed by one or more general purpose or special purpose processors, thus creating a special purpose computing device configured to provide functionality described herein.

Extensions and Alternatives

Many alternatives to the systems and devices described herein are possible. For example, individual modules or subsystems can be separated into additional modules or subsystems or combined into fewer modules or subsystems. As another example, modules or subsystems can be omitted or supplemented with other modules or subsystems. As another example, functions that are indicated as being performed by a particular device, module, or subsystem may instead be performed by one or more other devices, modules, or subsystems. Although some examples in the present disclosure include descriptions of devices comprising specific hardware components in specific arrangements, techniques and tools described herein can be modified to accommodate different hardware components, combinations, or arrangements. Further, although some examples in the present disclosure include descriptions of specific usage scenarios, techniques and tools described herein can be modified to accommodate different usage scenarios. Functionality that is described as being implemented in software can instead be implemented in hardware, or vice versa.

Many alternatives to the techniques described herein are possible. For example, processing stages in the various techniques can be separated into additional stages or combined into fewer stages. As another example, processing stages in the various techniques can be omitted or supplemented with other techniques or processing stages. As another example, processing stages that are described as occurring in a particular order can instead occur in a different order. As another example, processing stages that are described as being performed in a series of steps may instead be handled in a parallel fashion, with multiple modules or software processes concurrently handling one or more of the illustrated processing stages. As another example, processing stages that are indicated as being performed by a particular device or module may instead be performed by one or more other devices or modules.

In this description, numerous specific details are set forth in order to provide a thorough understanding of exemplary embodiments of the present disclosure. It will be apparent to one skilled in the art, however, that many embodiments of the present disclosure may be practiced without some or all of the specific details. In some instances, well-known process steps have not been described in detail in order not to unnecessarily obscure various aspects of the present disclosure. Further, it will be appreciated that embodiments of the present disclosure may employ any combination of features described herein.

While illustrative embodiments have been illustrated and described, it will be appreciated that various changes can be made therein without departing from the spirit and scope of the invention.

The embodiments of the invention in which an exclusive property or privilege is claimed are defined as follows:

1. A non-transitory computer-readable medium having stored thereon computer-readable instructions configured to cause a host computer system to perform steps comprising:
   receiving, by a host-side tablet device driver from a client-side tablet device driver, tablet data generated by a tablet device at a client computer system;
   adjusting the tablet data according to application-specific settings of the host-side tablet device driver; and
   sending the tablet data from the host-side tablet device driver to at least one hosted application at the host computer system, wherein the at least one hosted application is configured to be accessed by a user of the client computer system and to receive the tablet data adjusted according to application-specific settings of the host-side tablet device driver.

2. The non-transitory computer-readable medium of claim 1, wherein the tablet data is received by the host-side tablet device driver from the client-side tablet device driver via a dedicated driver-to-driver connection.

3. The non-transitory computer-readable medium of claim 1, wherein the tablet data is received by the host-side tablet device driver via a client-side data transfer application.

4. The non-transitory computer-readable medium of claim 3, wherein the client-side data transfer application comprises a web browser application.

5. The non-transitory computer-readable medium of claim 1, wherein the tablet device comprises a pen-input tablet device.

6. The non-transitory computer-readable medium of claim 1, wherein the host computer system hosts a plurality of hosted applications configured to be accessed by the user of the client computer system.

7. The non-transitory computer-readable medium of claim 6, wherein the computer-readable instructions are further configured to cause the host computer system to send the tablet data from the host-side tablet device driver to multiple available application programming interfaces for selection by a respective hosted application.

8. A host computer system that provides hosted application services for a client computer system that includes a tablet device, the host computer system comprising one or more processors, a network interface, and non-transitory computer-readable media comprising computer-readable instructions configured to cause the host computer system to perform steps comprising:
   receiving, by a host-side tablet device driver from a client-side tablet device driver, tablet data generated by a tablet device at a client computer system;
   adjusting the tablet data according to application-specific settings of the host-side tablet device driver; and
   sending the tablet data from the host-side tablet device driver to at least one hosted application at the host computer system, wherein the at least one hosted application is configured to be accessed by a user of the client computer system and to receive the tablet data adjusted according to application-specific settings of the host-side tablet device driver.

9. The host computer system of claim 8, wherein the tablet data is received by the host-side tablet device driver from the client-side tablet device driver via a dedicated driver-to-driver connection.

10. The host computer system of claim 8, wherein the tablet data is received by the host-side tablet device driver via a client-side data transfer application.

11. The host computer system of claim 10, wherein the client-side data transfer application comprises a web browser application.

12. The host computer system of claim 8, wherein the tablet device comprises a pen-input tablet device.

13. The host computer system of claim 8, wherein the host computer system hosts a plurality of hosted applications configured to be accessed by the user of the client computer system.

14. The host computer system of claim 13, wherein the computer-readable instructions are further configured to cause the host computer system to send the tablet data from the host-side tablet device driver to multiple available application programming interfaces for selection by a respective hosted application.

15. A method performed by a computer system including one or more processors, a network interface, and non-transitory computer-readable media, the method comprising:
   receiving, by a host-side tablet device driver from a client-side tablet device driver, tablet data generated by a tablet device;
   adjusting the tablet data according to application-specific settings of the host-side tablet device driver; and
   sending the tablet data from the host-side tablet device driver to at least one hosted application, wherein the at least one hosted application is configured to be accessed by a user and to receive the tablet data adjusted according to application-specific settings of the host-side tablet device driver.

16. The method of claim 15 further comprising receiving, by the host-side tablet device driver, the tablet data from the client-side tablet device driver via a dedicated driver-to-driver connection.

17. The method of claim 15 further comprising receiving, by the host-side tablet device driver, the tablet data via a client-side data transfer application.

18. The method of claim 17, wherein the client-side data transfer application comprises a web browser application.

19. The method of claim 15, wherein the computer system hosts a plurality of hosted applications configured to be accessed by the user.

20. The method of claim 19 further comprising sending the tablet data from the host-side tablet device driver to multiple available application programming interfaces for selection by a respective hosted application.

* * * * *